(12) United States Patent
Gustavsson et al.

(10) Patent No.: US 10,385,524 B2
(45) Date of Patent: *Aug. 20, 2019

(54) METHOD FOR PLACING AT LEAST ONE DUCT/COMMUNICATION CABLE BELOW A ROAD SURFACE IN AN AREA

(71) Applicant: DellCron AB, Stockholm (SE)

(72) Inventors: Conny Gustavsson, Hagersten (SE); Hasse Hultman, Handen (SE)

(73) Assignee: DellCron Innovation AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,711

(22) Filed: Nov. 22, 2016

(65) Prior Publication Data

US 2017/0073909 A1    Mar. 16, 2017

Related U.S. Application Data

(63) Continuation of application No. 13/884,515, filed as application No. PCT/SE2011/051345 on Nov. 10, 2011, now Pat. No. 9,537,292.

(30) Foreign Application Priority Data

Nov. 10, 2010  (SE) .................................... 1051177-2
Aug. 5, 2011  (SE) .................................... 1150732-4
Aug. 19, 2011  (SE) .................................... 1100598-0

(51) Int. Cl.
*E01C 23/09*    (2006.01)
*E02D 27/46*    (2006.01)
(Continued)

(52) U.S. Cl.
CPC ............ *E01C 23/09* (2013.01); *B23D 59/001* (2013.01); *B23D 59/008* (2013.01);
(Continued)

(58) Field of Classification Search
CPC ............ E02F 5/10; G02B 26/504; H02G 1/06
See application file for complete search history.

(56) References Cited

U.S. PATENT DOCUMENTS 4,006,315 A    2/1977  Halstead
4,554,724 A    11/1985 Bantz
(Continued)

FOREIGN PATENT DOCUMENTS

EP    1188864 A1    3/2002
FR    2641297 A1    7/1990
WO    WO 0229947 A1    4/2002

*Primary Examiner* — Benjamin F Fiorello
(74) *Attorney, Agent, or Firm* — Blank Rome LLP

(57) ABSTRACT

A method for placing at least one duct/communication cable below a road surface in an area. The area comprises a first layer and a second layer, the first layer being a road layer, such as asphalt or concrete, and the second layer being a bearing layer for the first layer and being located below the first layer. The method comprising the steps of cutting a micro trench in the area through the first layer into the second layer, placing at least one duct/communication cable in the micro trench so that that duct/communication cable is placed below the first layer, and filling the micro trench so as to restore the road surface.

10 Claims, 9 Drawing Sheets

(51) Int. Cl.
| | |
|---|---|
| *E02F 5/08* | (2006.01) |
| *E02F 5/10* | (2006.01) |
| *E02F 5/12* | (2006.01) |
| *E02F 9/24* | (2006.01) |
| *G02B 6/50* | (2006.01) |
| *H02G 1/06* | (2006.01) |
| *H02G 9/06* | (2006.01) |
| *B23D 59/00* | (2006.01) |
| *B23D 61/18* | (2006.01) |
| *F16L 1/032* | (2006.01) |
| *G05D 3/10* | (2006.01) |
| *E02F 5/00* | (2006.01) |
| *F16L 1/028* | (2006.01) |
| *E02F 5/18* | (2006.01) |
| *B23D 61/02* | (2006.01) |
| *B28D 1/04* | (2006.01) |
| *B28D 7/00* | (2006.01) |

(52) U.S. Cl.
CPC ........... *B23D 61/025* (2013.01); *B23D 61/18* (2013.01); *B28D 1/045* (2013.01); *B28D 7/005* (2013.01); *E02D 27/46* (2013.01); *E02F 5/00* (2013.01); *E02F 5/08* (2013.01); *E02F 5/10* (2013.01); *E02F 5/101* (2013.01); *E02F 5/12* (2013.01); *E02F 5/18* (2013.01); *E02F 9/245* (2013.01); *F16L 1/028* (2013.01); *F16L 1/032* (2013.01); *G02B 6/504* (2013.01); *G05D 3/10* (2013.01); *H02G 1/06* (2013.01); *H02G 9/06* (2013.01); *Y10T 83/175* (2015.04); *Y10T 83/849* (2015.04); *Y10T 83/852* (2015.04); *Y10T 83/866* (2015.04); *Y10T 83/929* (2015.04); *Y10T 83/9457* (2015.04)

(56) References Cited

U.S. PATENT DOCUMENTS

| | | |
|---|---|---|
| 4,812,078 A | 3/1989 | Rivard |
| 5,713,700 A | 2/1998 | Vogelsang |
| 5,827,013 A | 10/1998 | Fluharty et al. |
| 5,879,109 A | 3/1999 | Finzel et al. |
| 5,913,638 A | 6/1999 | Lansdale |
| 6,371,691 B1 | 4/2002 | Finzel et al. |
| 6,462,696 B1 | 10/2002 | Gorman |
| 6,511,260 B2 | 1/2003 | Kenkel et al. |
| 6,637,978 B1 | 10/2003 | Genta |
| 6,866,448 B2 | 3/2005 | Finzel et al. |
| 7,095,930 B2 | 8/2006 | Storaasli et al. |
| 7,197,216 B2 | 3/2007 | Storaasli et al. |
| 7,524,142 B2 | 4/2009 | Scott |
| 8,047,744 B2 | 11/2011 | Hall |
| 9,537,292 B2 * | 1/2017 | Gustavsson ............... H02G 1/06 |
| 2004/0234215 A1 | 11/2004 | Serrano et al. |
| 2005/0191133 A1 | 9/2005 | Purcell |
| 2007/0286681 A1 * | 12/2007 | Parent ..................... E02F 5/101 405/174 |

\* cited by examiner

METHOD FOR PLACING AT LEAST ONE DUCT/COMMUNICATION CABLE BELOW A ROAD SURFACE IN AN AREA

This is a continuation of U.S. patent application Ser. No. 13/884,515, filed Jul. 15, 2013, which is a 371 of International Application No. PCT/SE2011/051345, filed Nov. 10, 2011, the entire disclosures of which are incorporated by reference in their entireties herein.

TECHNICAL FIELD

The present invention relates to method for placing at least one duct/communication cable below a road surface in an area.

BACKGROUND OF THE INVENTION

The expansion of fibre optic networks for communication in residential areas is often hampered by the high cost of excavation and restoration of the road layer, such as asphalt or concrete. A typical residential connection may cost approximately EUR 3 000 plus VAT, and hence many homeowners are reluctant to make such an investment. This in turn means that the connection rate for houses is low when a residential area is built, which further increases the cost of connecting. The reason for this is that the cost for the backbone is more or less independent of the connection rate, and a low connection rate means that fewer houses will have to bear the total cost for the backbone.

An alternative, to provide house connections through green open spaces at the back of houses is in most cases not possible. Certainly, this would make the costs considerably lower as it may even be possible to plough down channelling tubing/ducts for fibre cables but this often involves crossing gardens in the homes of people not wanting to connect. There is also the question of flowerbeds, bushes and trees, which can be costly to replace/restored. Finally, it would probably be an enormous task to arrange permission from all the homeowners affected if this method should be employed.

A technique for installing fibre is described in document L.40 produced by the International Telecommunication Union (ITU-T Recommendation L.49, 2003). Document L.40 describes a micro trench installation technique for fibre cables.

SUMMARY OF THE INVENTION

An object of the present invention is to provide a method which fully or in part solves the problems of prior art solutions. Another object of the present invention is to provide a method for placing at least one duct/cable (e.g. communication cable) below a road surface in an area in a way that reduces the cost for fibre installation compared to prior art methods. Yet another object of the present invention is to provide an alternative method for placing at least one duct/communication cable below a road surface in an area.

The above mentioned objects are achieved by a method for placing at least one duct/communication cable below a road surface in an area according to the invention. Said area comprises a first layer and a second layer, said first layer being a road layer, such as asphalt or concrete, and said second layer being a bearing layer for said first layer and being located below said first layer, said method comprising the steps of:
  cutting a micro trench in said area through said first layer into said second layer;
  placing at least one duct/communication cable in said micro trench so that said at least one duct/communication cable is placed below said first layer; and
  filling said micro trench so as to restore said road surface.

Embodiments of the method above are defined in the appended dependent method claims.

With a method according to the present invention ducts/communication cables are placed at safe depth. This means that the fibre optic network will be safe if the road surface is removed and/or replaced. Further, the invention provides a method with minimum damage made to roads when placing ducts/cables which reduces the cost for restoration of the same.

Other advantages and applications of the present invention will be apparent from the following detailed description of the invention.

BRIEF DESCRIPTION OF THE DRAWINGS

The appended drawings are intended to clarify and explain the present invention, in which.

DETAILED DESCRIPTION OF THE INVENTION

To achieve the above mentioned objects a method for placing at least one duct/communication cable below a road surface in an area is provided by the inventors.

The area comprises a first layer L1 and a second layer L2. The first layer L1 is a road layer, such as asphalt or concrete, and the second layer L2 is a bearing layer for the first layer L1 and is located below the first layer L1.

Figure 1:
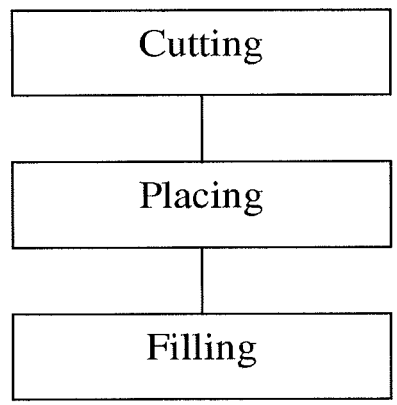
FIG. 1 shows a flow chart of a method according to the present invention.

With reference to FIG. 1, which shows a flow chart of a method according to the present invention, the method for placing at least one duct/communication cable below a road surface in the area comprises the steps of:
  cutting a micro trench in the area through the first layer L1 into the second layer L2;

placing at least one duct/communication cable in the micro trench so that the at least one duct/communication cable is placed below the first layer L1; and filling the micro trench so as to restore the road surface.

Figure 3A:
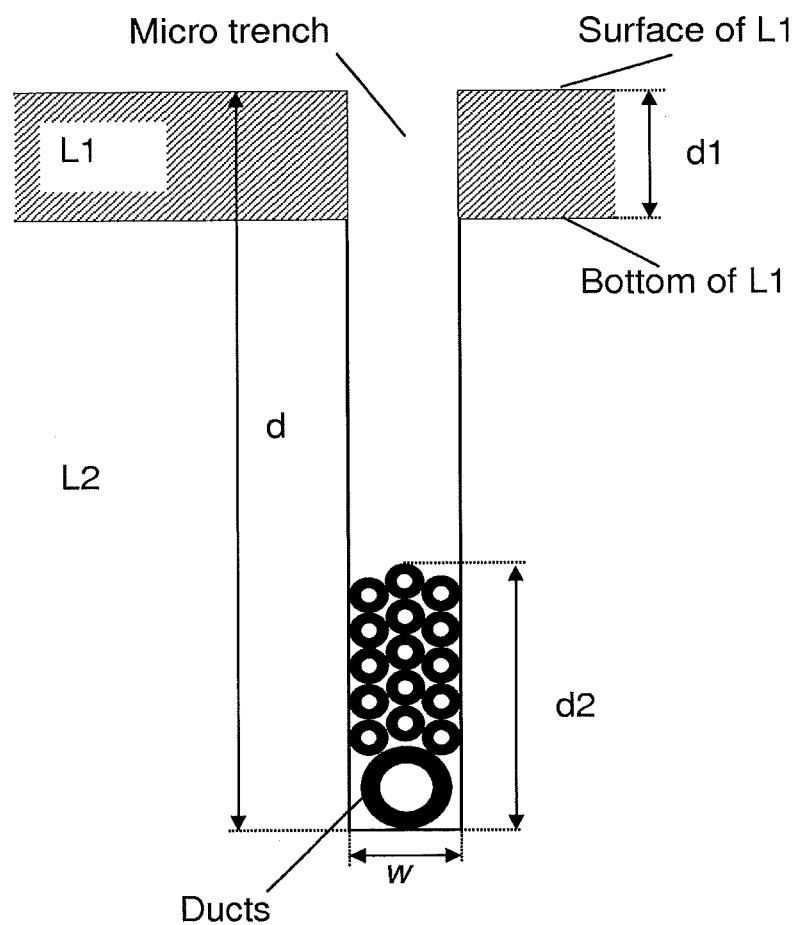
FIGS. 3a and 3b schematically shows a cross section of a roadway area with a micro trench according to the invention.
Figure 3B:
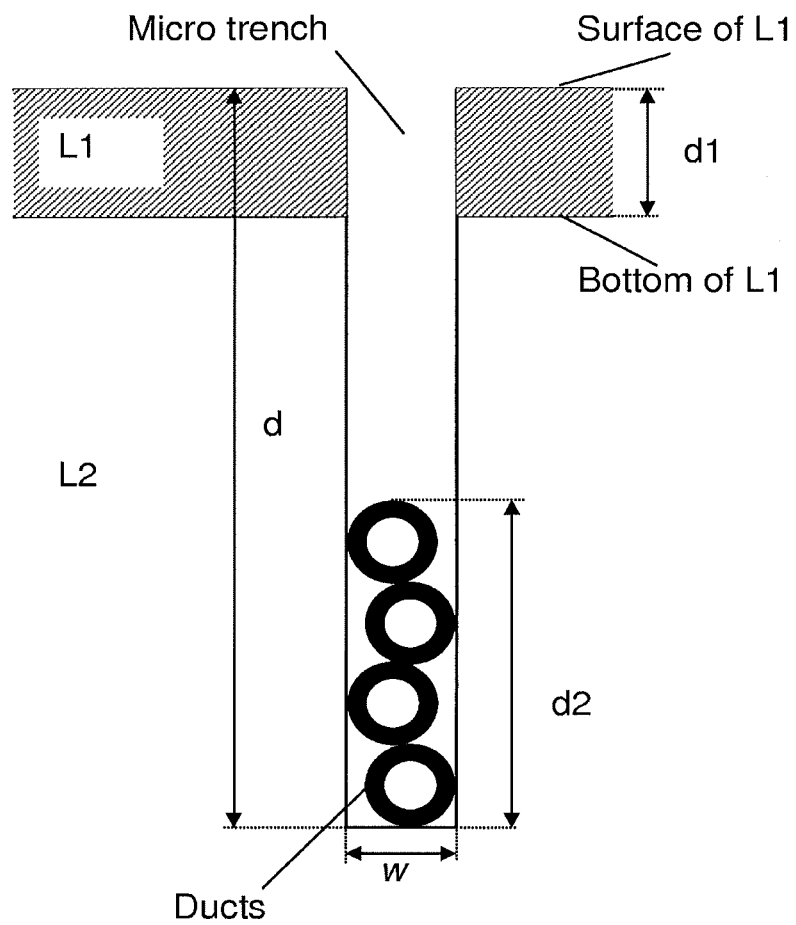

FIGS. 3a and 3b schematically shows a cross section of an area in which a duct is placed in a micro trench. The area in FIGS. 3a and 3b is a three dimensional region of a typical roadway area, wherein the area comprises a first layer L1 being a road layer such as asphalt or concrete, and a second layer L2 being a bearing layer for the first layer L1 and usually consisting of macadam, sand and earth. The second layer L2 is naturally located below the first layer L1 as shown in FIG. 3.

According to the invention the cutting step involves: cutting the micro trench through the first layer L1 into the second layer L2, which means that the micro trench is cut as shown in FIGS. 3a and 3b. The micro trench is cut so deep that at least one duct/communication cable is placed in the micro trench below the first layer L1 (i.e. all installed ducts/communication cables are placed below the first layer L1). Using the present method all ducts and cables for fibre optic networks can be placed deep enough so that they are safe if the road layer L1 is removed and/or replaced, e.g. when repairing the road.

Thereafter, the at least one duct and/or a communication cable is placed in the micro trench. The duct is a duct arranged to hold "air-blown fibre" (so called EPFU) or fibre cables. The duct/s and/or the communication cable/s are placed in the micro trench so that they are entirely positioned below the first layer L1.

Finally, the micro trench is filled with a suitable filling material so that the road surface is restored. The filling material is sand or any other material with suitable properties. The micro trench is filled with the filling material to a suitable level, and if needed the filling material is thereafter packed with a compactor that fits the width w of the micro trench.

Finally, the micro trench is sealed using a sealing material, such as bitumen, in order to get a water tight sealing. If a water tight sealing is not needed, patching may also be made with cold asphalt which is a simple and cheap method of restoration. A suitable amount of cold asphalt is simply poured and scraped into the micro trench, and thereafter compacted to a smooth and hard surface. Any excess asphalt can then be collected and removed.

The filling step may according to a preferred embodiment of the invention further involve the steps of:

sealing the micro trench flush to a bottom of the first layer L1 with a first sealing S1; and sealing the micro trench flush to a surface of the first layer L1 with a second sealing S2.

Figure 4:
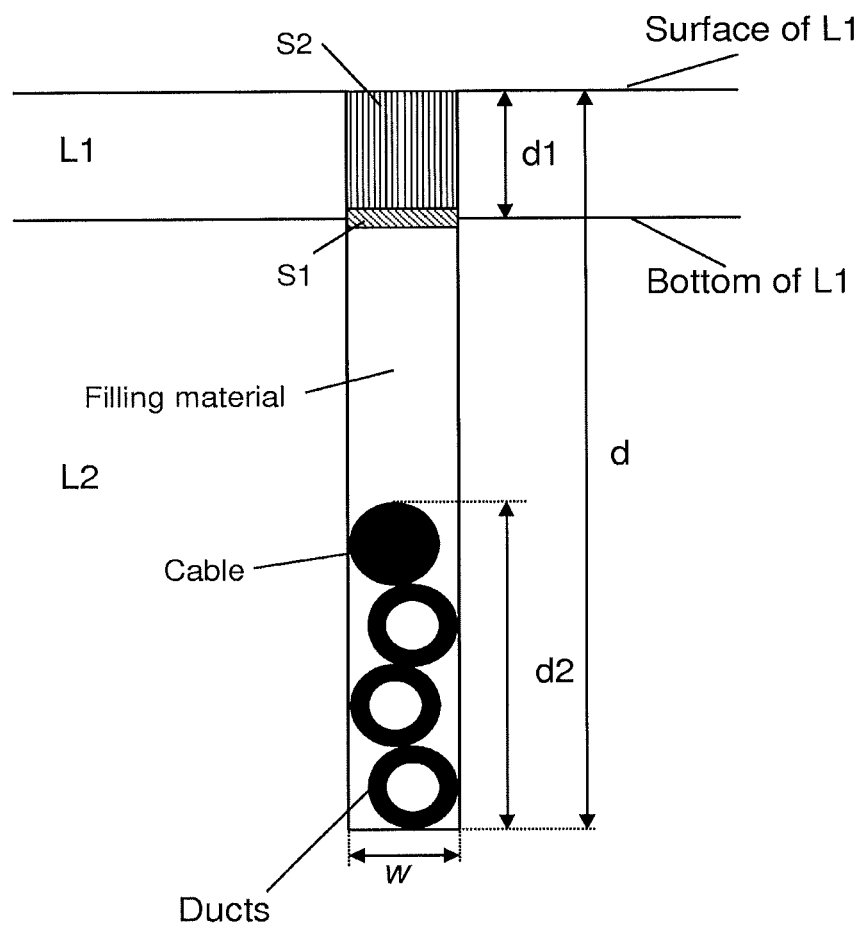
FIG. 4 schematically shows the cross section in FIG. 3, wherein the micro trench is filled with filling material such as sand and sealed with two sealing layers.

FIG. 4 shows the above described embodiment. The surface and the bottom of the first layer L1 are indicated in FIG. 4, In order to obtain a sealed repair with high adhesion it is recommended to pour hot bitumen or bitumen mix when sealing the micro trench. However, other material such as concrete or polymer modified asphalt will work.

The first sealing S1 is put down to seal the micro trench substantially flush with the bottom of the first layer L1 so that the micro trench can be cleaned with a high-pressure washer to remove any residue of sand from the asphalt/concrete edges. After washing, the micro trench may be dried and pre-heated using a propane burner and finally, the micro trench is filled flush with the top surface of the first layer L1 using a suitable sealant such as a hot crack sealant based on bitumen.

According to yet another embodiment of the invention, the micro trench is sawn/cut with a disc cutter/sawing machine having a diamond coated sawing disc. Such a diamond coated sawing disc can easily saw through even the hardest materials, such as stone and concrete, and has proved very useful in the present application since it provides exceptionally clean cuts when cutting micro trenches. Prior art methods to cut micro trenches, such as using a sawing disc with tungsten carbide teeth, creates cracks in the edges of the micro trench that will make complete sealing afterwards much harder and much more expensive compared the invention.

Figure 8:
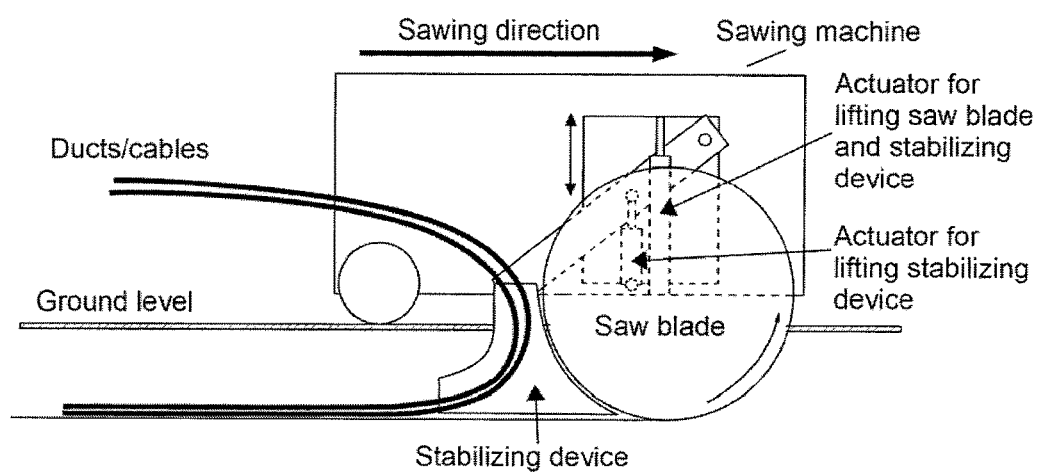
FIG. 8 shows a sawing machine according to an embodiment of the invention with its sawing blade/disc cutter and a stabilizing device stabilizing device for placing ducts/cables immediately behind the sawing blade.
Figure 9:
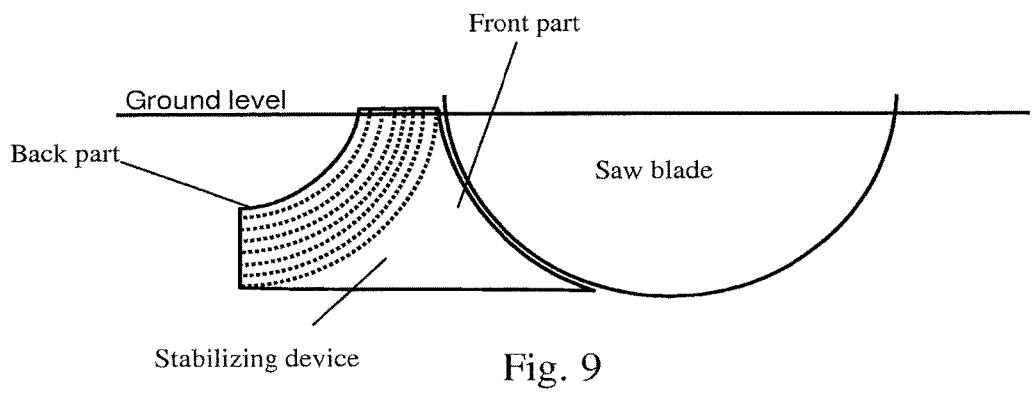
FIG. 9 shows an embodiment of the sawing machine where the stabilizing device is adapted for placing a plurality of ducts/cables at the same time while maintaining the order of the ducts/cables in the micro trench.

The micro trench is preferably sawed/cut with a modified so-called road-saw (sawing machine) having a diamond coated sawing disc. To further optimise the performance of the road saw in the present application, the inventors have realised that one or more of the following improvements are useful and should be considered as embodiments of the invention:

Change in rotational direction of the sawing disc to so-called "up-cut" for improved transport of cuttings so as to keep the trench clean which is important;

Modified cover for the sawing disc and a front outlet to optimise the transport of cuttings and reduce spreading of dust and leave the micro trench clean and ready for laying ducts/cables;

Stabilizing device as shown in FIGS. 8 and 9 with one or more guiding means for ducts/cables immediately after the sawing disc so that micro trenching and placing of ducts/cables can be carried out in one process. In case the stabilizing device has guiding means for a plurality of ducts/cables, these guiding means should be arranged so the outlets from the stabilizing device are placed on top of each other in such a way that the order of the ducts/cables from the inlet into the stabilizing device and into the micro trench is preserved;

Trolley drawn by the road saw with holder for drums for ducts/cables and warning tape with tracking wire; and Servo to keep the sawing disc vertical on uneven surfaces, e.g. when two wheels of the road-saw are on the pavement and two wheels are on the road.

FIG. 8 shows an embodiment of the invention using a sawing machine comprising a sawing disc arranged for up-cut. Up-cut is defined as the rotating direction of the sawing disc in relation to the sawing direction as shown by FIG. 8. All known sawing machines have the opposite rotating direction. By changing the rotating direction of the sawing machine to up-cut helps to remove the cut material from the micro trench, thereby providing "clean" micro trenches.

Further, the sawing machine comprises a stabilizing device arranged immediately behind the sawing disc, wherein the stabilizing device has at least one guiding means, such as channels, for guiding the duct/cable when placed in the micro trench immediately after the sawing disc. If a plurality of ducts/cables is placed at the same time, the stabilizing device is arranged to be able to place the ducts/cables in preserved order. This may be achieved by having individual channels for the ducts/cables in the stabilizing device so that the order of the ducts/cables will be maintained through the stabilizing device. Thereby, it is possible before the ducts/cables enter into the stabilizing device to identify which duct/cable will come out on top in the micro trench and thereby making it possible to know which duct/cable to cut for each final location, see FIG. 10.

Generally, the depth d of the micro trench should be larger than the depth of the first layer d1 together with the height d2 of at least one duct or at least one communication cable according to an embodiment of the invention, i.e. d>d1+d2 which means that the depth d of the micro trench is larger than the height of the first layer d1 plus the combined height of one ore more ducts and/or communication cables. As can be deduced from FIGS. 3a, 3b and 4, the above mentioned relation holds.

However, costs increase with increased depth d of the micro trench. Therefore, the micro trench should not be deeper than necessary. Normal depth d of the micro trench can be around 400 mm, and unlike the width w of the micro trench, the depth d can often be adjusted continuously while in operation when using a disc cutter. The cutter depth can therefore be reduced gradually as the number of ducts laid in the micro trench is reduced.

Further, the micro trench should not be wider than necessary, since a wider micro trench is more expensive than a narrower micro trench. On the other hand a narrower micro trench can make it more difficult to install the ducts/cables, so there is an optimal width of the micro trench, since e.g. if the micro trench is too narrow, all ducts/cables will be piled on top of each other so that the depth of the top duct/cable will be too shallow.

From the above discussion, the inventors have through tests realised that suitable dimensions for a micro trench should have a depth d between 200-500 mm (and preferably 300-500 mm) and a width w between 10-30 mm (and preferably 15-25 mm) according to an embodiment of the invention for installation efficiency and low cost. Further, with these dimensions minimum disruption of traffic is possible when placing ducts/cables since traffic can pass over an open micro trench.

Figure 2:
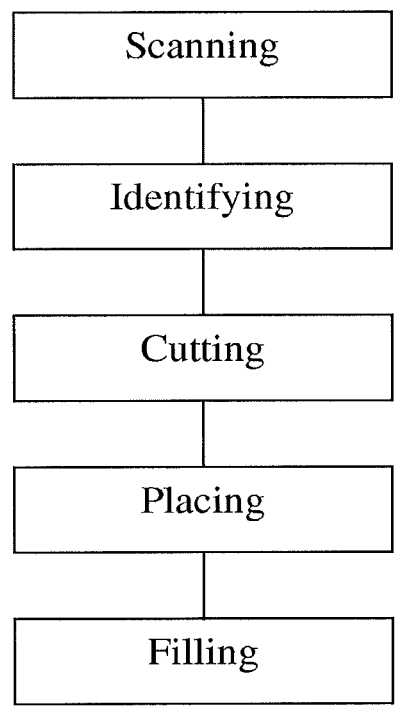
FIG. 2 shows a flow chart of an embodiment of a method according to the invention.

Furthermore, with reference to the flow chart in FIG. 2, according to another embodiment of the invention, the method for placing at least one duct/cable comprises the steps of:
  scanning an area by means of a ground penetrating radar; and
  identifying obstacles in the area using data generated by the ground generated radar,
  cutting a micro trench in the area through the first layer L1 into the second layer L2;
  placing at least one duct/communication cable in the micro trench so that the at least one duct/communication cable is placed below the first layer (L1); and
  filling the micro trench so as to restore the road surface.

It should be noted that the steps of scanning and identifying are performed before the other steps in the method according to this embodiment.

According to this embodiment, the area is scanned by means of a ground penetrating radar device, such as a GEO-radar/scanner or any other suitable equipment.

Thereafter, possible underground obstacles in the area, such as sewer pipes, electrical cables, construction structures, etc. are identified using information generated by the ground penetrating radar device. The scanning and identifying steps means that when performing the subsequent cutting step it may be avoided to accidentally cut/damage obstacles in the area which may result in delay and extra cost in the micro trenching process. After cutting a micro trench in the scanned area, at least one duct and/or a communication cable is placed in the micro trench. Finally, the micro trench is filled with a suitable filling material so that the road surface is restored.

The method according to the invention may also involve the step of: installing or blowing fibre or fibre cable in one or more ducts if ducts were placed in the micro trench.

It should also be noted that the method described above also may comprise the step of: making one or more branching points connected to the micro trench. Preferably, the branching points may be made by means of a diamond coated core drill or a hand-held sawing machine with a diamond coated sawing chain or disc. As for this described embodiment the method may also comprise the further step of: boring one or more channels from the branching points to one or more houses using controlled or guided boring. It is important that channels are bored below the first layer L1 in the second bearing layer L2. Ducts/cables are thereafter installed in these channels when the drill is pulled back.

Different aspects concerning the layout of micro trenches, branching points and channels, and strategies of cutting, branching, etc, in relation to and incorporated in the present invention will be discussed in the following description.

Layout

Figure 5:
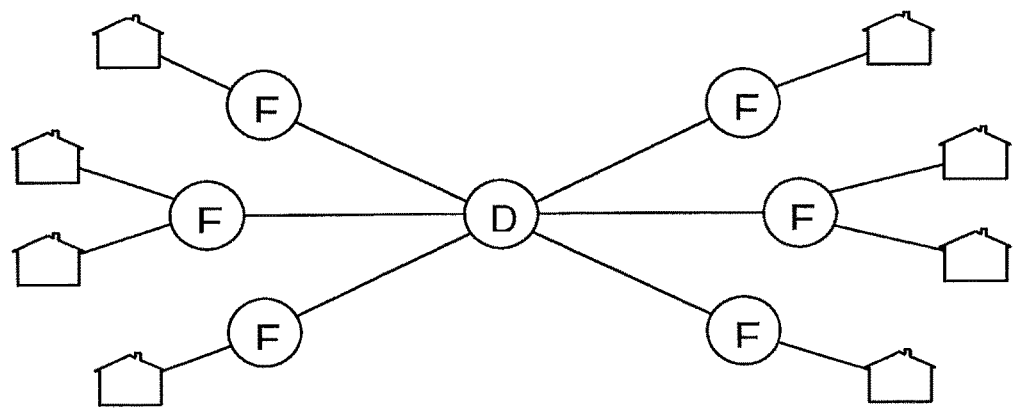
FIG. 5 shows a typical layout of a FTTH network.

FIG. 5 shows a typical logical structure of a Fibre To The Home (FTTH) network in a residential area, where "D" is a distribution node and "F" is a splicing point where larger fibre cables are spliced to smaller ones (or in case of a PON network where optical splitters are placed). The network between a distribution node D and a splicing point F is called distribution network and the network between the splicing point F and the individual homes is called access network. Both the ducts/cables for the distribution network and for the access network can be installed using the method according to the present invention.

A residential area being constructed with FTTH is normally divided into a number of smaller residential subareas. Somewhere in the residential area or outside of the residential area there must be a site where optical panels and electronics needed to form a so-called distribution node D are housed. The distribution node D can be housed in an existing building or in a small dedicated built building or in a large ground cabinet. Each distribution node D may contain electronics and optical panels for anywhere between a few hundred households up to several thousand households. The size of the area to be built from a single distribution node D can be adjusted within wide limits and depends primarily on practical considerations, such as space in the distribution node D, difficulties with management of a large number of smaller distribution nodes D, etc. This concept can also be adapted for any number of fibres per household.

There are two main types of FTTH networks: point-to-point-networks and point-to-multipoint networks. In a so-called point-to-point-network, the distribution node D contains the other ends of all fibres that originate from the households in the residential area. If e.g. a residential area with 500 households is being equipped with 2 fibres per house, there will be 1000 incoming fibres to the distribution node D. The distribution node D should preferably have a central location in the area being built as shown in FIG. 5.

The fibre structure of a point-to-multipoint-network or a so-called Passive Optical Network (PON) is more or less the same. The difference being that the number of incoming fibres to the distribution node D in this case equals the number of households divided by a factor (e.g. 8, 16, 32, etc.). The examples in the continuing discussion are made assuming that a point-to-point-network is being built. However, described methods also apply to a PON if only the distribution cables are scaled accordingly.

Viewed from the distribution node D, distribution cables extend out to splicing points F in manholes or cabinets. Distribution cables are normally designed for the number of households in the area plus 10% spare so that in the future, newly built buildings easily can be added to the network. In a point-to-point-network, if e.g. a splicing point covers an area with 22 houses and the requirement is two fibres per house, then 48 fibres from the distribution cable are needed. Fibres from the distribution cables are spliced in the splicing points F to fibres from the access cables. These access cables then extend to each one of the houses being connected.

How many houses a splicing point F serves mainly depends on economic issues. If the covered area is too large, this will increase the average length of access cables to the houses, which increases costs. On the other hand, if the covered area is too small the cost for each house will rise in relation to its share of splicing point F and distribution cable. Hence, there is an optimum size to the residential area where the cost is the lowest. The number of houses that would minimise the cost depends mainly on the topography of the residential area and how large the plots of land are on which the houses are standing, but a rule of thumb is that an optimum size is normally somewhere between 16 and 48 houses from each splicing point F according to the invention.

If micro trenching is carried out using a disc cutter according to an embodiment of the invention, the splicing point F should be placed centrally in each residential sub-area, with e.g. around 22 houses. The splicing point F can be physically realised in a street cabinet or in a manhole by the roadside. Then, typically 10-12 ducts extend from the ground cabinet or manhole each way along the road. Each of these ducts then extends into each of the houses. Finally, access cables are blown into each of these ducts.

Strategy when Cutting

Usually, residential areas have houses on both sides of a road, and this situation can be tackled in one of two different ways: either micro trench in the roadside on both sides of the road and connect the houses to the closest micro trench, or micro trench on only one side of the road or in the middle of the road and connect houses on both sides to this micro trench.

However, to minimise the number of micro trenches across the road, start to micro trench to a boundary between two properties (houses) on the opposite side of the road according to an embodiment of the invention. Then place a duct/channelling tube in that micro trench to each one of the two properties. In this way, a micro trench across the road need only be made for every second property on the opposite side of the road. Micro trenching across the road for every second property then this will be a cheap and cost effective method.

Branching Off a Main Trench

Figure 6:
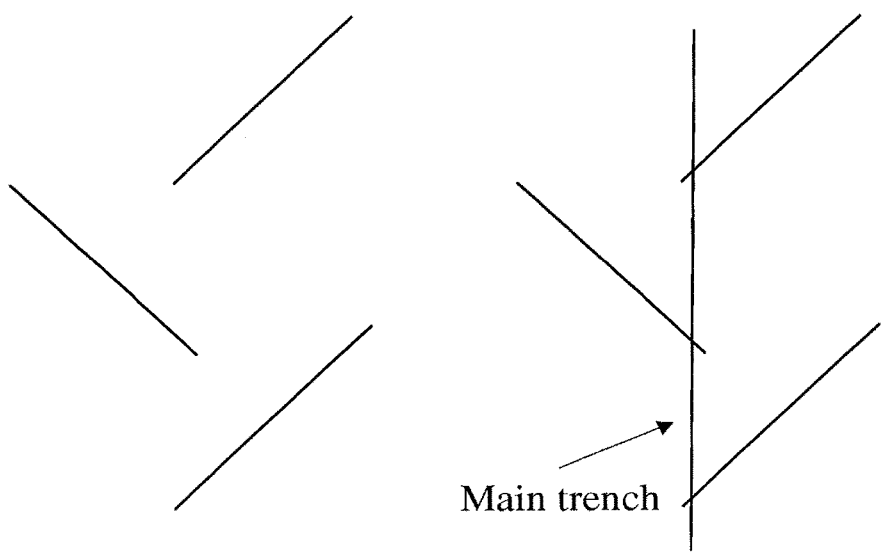
FIG. 6 shows how to saw branches to individual homes from a main micro trench.
Figure 10:
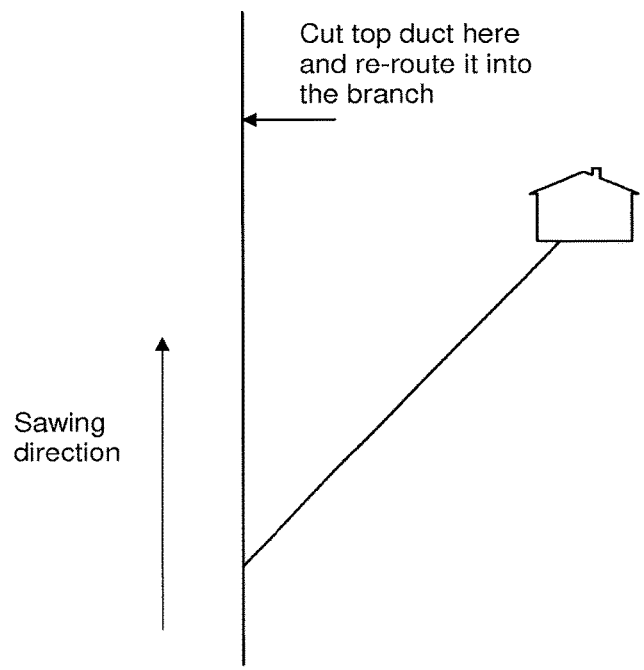
FIG. 10 shows in detail where to cut the top duct so that it will be long enough to reach its final destination.

Branching off from a main micro trench (a main micro trench is defined as a micro trench along a road) can be carried out in a number of ways. The branches may be sawn either before as shown in FIG. 6 or after the main micro trench is sawn. Both methods are best done at about a 45° angle from the main micro trench in order to obtain a large radius curve for the ducts/tubing. The branches may cross the location of the main micro trench or go "flush" with the main trench. When the main micro trench is sawed and the ducts/channelling tubes are laid it is easy to one by one route one of the uppermost tubes through each of the sawed branches up to each residence, as shown in FIG. 10 and to the right in FIG. 6.

An alternative method of branching is to first bore a hole at each branching point with a suitably sized core drill. The main micro trench can then be cut along all these holes in the same manner as described above as shown in FIG. 7. This method is suited both to making the house connections with a micro trench cut in the way described above as well as making house connections with controlled boring.

An alternative method of branching is to first make a hole at each branching point. The holes may be made using a suitably sized core drill (for a round hole) or using a hand tool with a diamond cutting blade or chain (for a square hole). The main micro trench can then be cut along all these holes in the same manner as described above and as shown in FIG. 7. This method is suited both to making the house connections with a micro trench cut in the way described above as well as making house connections with controlled boring. Controlled boring is sometimes preferred for making the house connections, because it avoids (e.g. goes under) obstacles like fences, hedges, trees, etc. However, another piece of expensive machinery (core drill) is needed at the installation site.

Sawing Machine and Stabilizing Device

It has been realized by the inventors that the placement/installation of ducts/cables should preferably be made before the sides of the trench collapses and before stones (or debris) and in particular stones larger than the width of the trench are wedged into the sides of the trench and prevents the installation of the ducts/cables all the way down to the bottom of the trench. By achieving this time (and money) can be saved since the installation can be performed without unnecessary interruptions.

Therefore, a sawing machine as already mentioned is arranged for sawing micro trenches in an area. In this respect, the machine comprises a saw blade, preferable circular in shape, for sawing/cutting the micro trenches. The produced micro trenches are adapted for receiving ducts/cables which means that the micro trenches have the proper dimensions.

The machine also comprises a stabilizing device arranged for stabilizing the walls of the micro trench when placing ducts/cables, and for this purpose the stabilizing device is positioned immediately behind the saw blade in the micro trench, so that the walls are stabilized until the ducts/cables have bee placed/installed by means of guiding means which are also arranged on the stabilizing device.

For stabilizing the walls of the trenches, the stabilizing device comprises suitable stabilization elements such as proper side elements which are arranged to "hold up" the walls until the ducts/cables have been installed in the trenches. It is important that the stabilizing device is positioned immediately behind the saw blade so that the trenches sawn by the saw blade are stabilized directly after they are produced so that they do not collapse, or that debris or other dirt fall into the trenches before the ducts/cables have been placed. Therefore, a closest distance between the saw blade and the stabilizing device is larger than 0 mm but less than 10 mm according to an embodiment. The dimension of the stabilizing device is dependent on the size of the ducts/cables, the number of ducts to be placed at the same time, and the depth for placement in the trench. However, the width of the stabilizing device should be slightly less then the width of the sawing blade.

Furthermore, for achieving controlled and automatic placement of the ducts/cables the device has also guiding means which guides the ducts/cables into the trench in a controlled and ordered manner. The combination of stabilization and guiding has proved to reduce cost and time in an effective manner since the process of sawing and installing can be performed at the same time. The guides are arranged on the stabilizing device and hence makes it possible to place the ducts/cables into the trench while the trench is stabilized by the device. The ducts/cables can therefore be placed with high precision into the trench (e.g. on the correct height in the trench) since the trench is "clean" as long as the trench is stabilized by the device.

The stabilizing device may be made of any suitable strong material so that the trenches are stabilized. The material should preferably be rigid, tough, hard and yet flexible so as to withstand stress during operation. The mounting of the stabilizing device to the sawing machine should have an amount of flexibility to prevent damage if the stabilizing device is stuck in the trench. Steel or steel alloys are suitable since they can be given the right properties by alloying with different metals such as platinum and manganese. There is limited space in the trench so the walls of the stabilizing device have to be thin as possible so as to be able to accommodate the passing the ducts/cables but still have the properties mentioned above. Steel alloys in the hardness of about 400-700 Brinell have proved suitable for these applications. It has also been realised that the stabilizing device can be made of moulded carbon fibre. Different parts of the stabilizing device can be cast separately and assembled into stabilizing device assembly.

According to an embodiment, the device has an inlet and an outlet for ducts/cables, the inlet and outlet being connected to the guiding means. Preferably, the guiding means are channels through which the ducts/cables are guided through the stabilizing device. When in operation, the inlet is preferably above ground and vertically or close to vertically arranged while the outlet is below ground in the trench and horizontally or close to horizontally arranged in order to minimize wear and tear on the ducts/cables. Therefore, a minimum distance between the outlet and the saw blade (at ground lever) is slightly longer than the recommended minimum bending radius for the ducts/cables to be installed. This normally translates to somewhere between 100 to 500 mm measured at ground level, but other distances are possible. Further, the inlet, outlet and guiding means may together be removably attached on the stabilizing device e.g. in the form of a removable cassette. By having a removable cassette for the guiding means, the installation time shortens in some cases as the time consuming task of inserting many ducts/cables into their respective channels may be avoided It has also been realized by the inventors that an operating depth for the stabilizing device in the micro trench should be up to 50 mm less than an operating depth for the saw blade according to an embodiment. This difference in depth between the saw blade and the stabilizing device, when in operation, decides how quickly the ground level may change (i.e. goes down). The saw blade must have sawed the trench deep enough so that the stabilizing device never touches the bottom of the trench in order to avoid the possibility of the stabilizing device sticking to the ground. This avoids unnecessary forces on the stabilizing device and possible breakage. This may happen when the ground level suddenly becomes lower.

Moreover, according to yet another embodiment, shown in FIG. 8, the stabilizing device and the saw blade are arranged to be elevated and lowered independently of each other. This is advantageous when for example the saw blade has to be changed due to wear or when another type of saw blade is needed (e.g. one type for asphalt and another type for concrete). Further, the stabilizing device may have to be replaced which may easily be performed if the two parts can be lowered and elevated independently of each other. Also, during shorter interruptions in the sawing operation, the sawing blade is elevated, but the stabilizing device must remain in the ground, since the need for stabilization of the trench still exists. However, the stabilizing device and the saw blade may further be arranged to together be elevated and lowered, e.g. when underground infrastructure is encountered both parts can be elevated so as to avoid damage.

The stabilizing device is preferably mounted separately on the sawing machine by means of a number of movable axes for elevation and lowering. The movable axes may be powered by a dedicated engine for this specific purpose. Further, the sawing machine may have on its left and right sides (in the sawing direction) quick mount attachments means and driving means for both the stabilizing device and the saw blade. Thereby, any of the left or right sides of the sawing machine can be used for sawing and placing ducts/cables which may be necessary due to hindering infrastructure, traffic situation in the areas, etc.

FIG. 9 shows an embodiment of a machine. The stabilizing device has a front part and a back part, wherein the front part is located immediately behind the saw blade. It can also be seen that the stabilizing device has a section at the front part that has a shape that is complementary to the shape of the saw blade which in this particular case is circular. Thus, in case the section at the front part has a concave circular shape with the same radius, or close to the same radius, as the saw blade and is placed as close as possible and less than 10 mm away from the saw blade. The reason for this is that the underground part of the stabilizing device must be arranged so close to the saw blade such that it is virtually impossible for dirt, stones and other debris to fall to the bottom of the trench or wedge between the sides of the trench. The guiding means in this embodiment are guiding channels inside the stabilizing device. The channels are illustrated with dotted lines in the figures.

Figure 11:
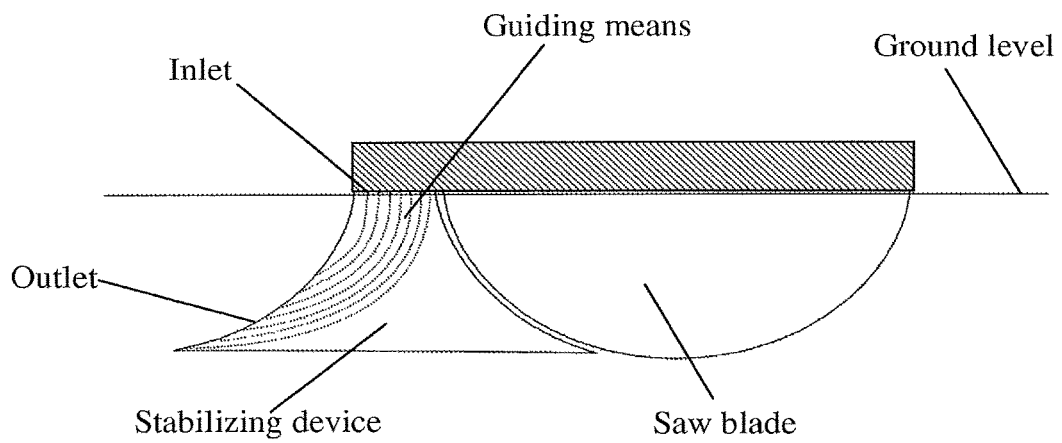
FIGS. 11-13 shows further embodiments of the stabilizing device (the channels are only illustrated in FIGS. 11-13 and should therefore not be seen as true representations).
Figure 12:
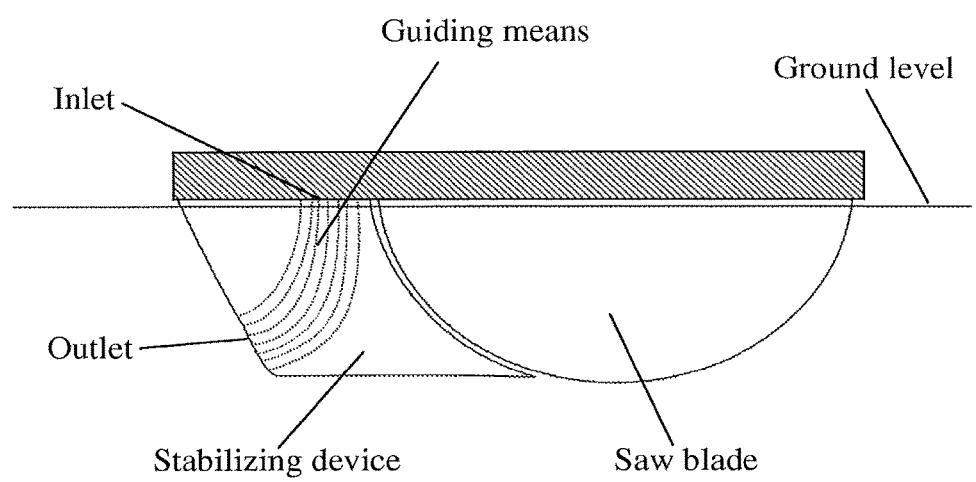
Figure 13:
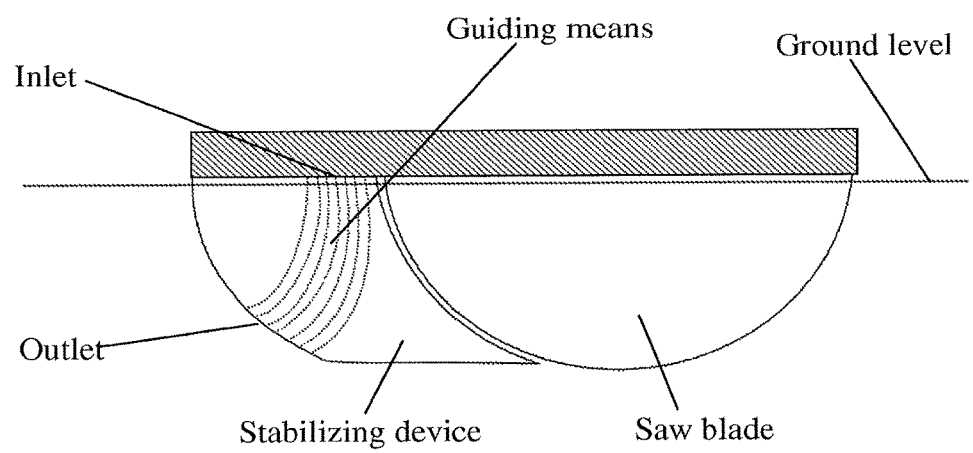

Further, the back part of the stabilizing device where the outlet is arranged may have different preferred shapes. One shape is substantially parallel to the complementary shape of the front section described above. Another shape is substantially opposite to the complementary shape, and a third embodiment defines a shape for the back part which is substantially diagonal from the base to the top of the back part in the backwards direction. These embodiments are shown in FIGS. 11-13. It is further to be noted that the inlet, outlet and channels are arranged on the back part of the stabilizing device in this embodiment. The stabilizing device may also be axe shaped in cross section at front part.

Preferably, as mentioned above the stabilizing device has a maximum width in cross section that is equal to or slightly less than a width for the saw blade. The stabilizing device must be wide enough to have room for the ducts/cables to be installed, but small enough so that it can be drawn along the sawed trench.

Another important aspect is that with the use of guiding means an order of a plurality of ducts/cables is preserved when placed in the micro trench. This is very important when more than one duct is placed at the same time. In one installation scenario, the duct/cable for a certain house is cut at a certain distance after the house. It is important that this duct/cable is one of the ducts/cables on top of the pile of ducts/cables in the trench, so that it can be easily found. The duct/cable must be cut before the stabilizing device. Therefore it is important to know which one of all ducts/cables that enters the stabilizing device will come out on top in the trench. Moreover, as the color of the duct/cable for a certain house is in many cases decided before the sawing begins, the order of the ducts/cables must be arranged so that the duct/cable with correct colour comes out on top, cut to the correct length, in the trench when that particular house is passed.

Figure 7:
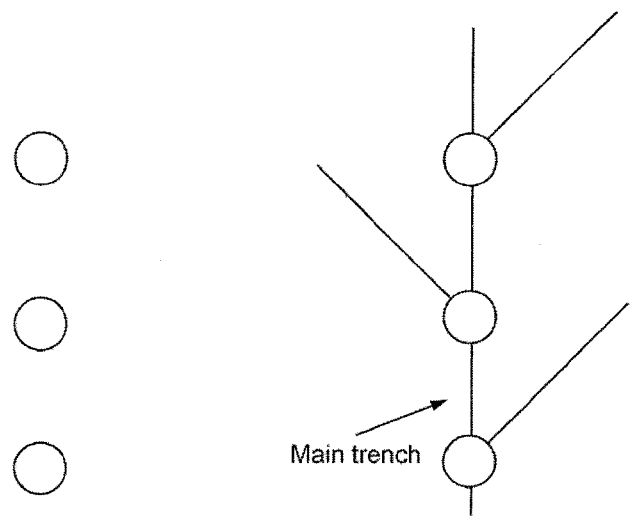
FIG. 7 shows branching to individual homes if boring is used instead of sawing.

A method which allows the placement of a plurality of ducts/cables at the same time has a very high commercial value since the process of placement can be performed much faster than what has previously been known in the art. Therefore, according to this embodiment, the stabilizing device has a plurality of guiding means each guiding one or a few ducts/cables into the trench. For example, the device may comprise a plurality of channels so arranged that a known order is preserved, which means that an order of the ducts/cables out of the stabilizing device is known form the order of ducts/cables into the stabilizing device, hence the order into and out of the stabilizing device is related and known. This can e.g. be achieved by a one-to-one mapping between the inlet and the outlet of the device. The order of the ducts/cables should be arranged in such a way that one of the ducts/cables on top of the pile of ducts/cables in the trench is always the one to be routed to the next location. Therefore, a downmost duct/cable entering the inlet will be an uppermost duct/cable out from the outlet, and the uppermost duct/cable entering the inlet will be a downmost duct/cable out from the outlet. The branching micro trenches may be sawn before the main trench as shown in FIGS. 6 and 7 or the branching micro trenches may be sawn after the main trench is sawn. The particular order in which the trenches are sawn may be decided to achieve the best flow during the installation. Each branching micro trench goes to a final location for one of the ducts/cables from the main micro trench. When the main trench is sawn and the ducts/cables are installed, the uppermost duct/cable is cut (before it enters the stabilizing device) at a certain distance beyond the location of the respective branching trench, so that that duct/cable can be lifted and routed to the final location for that duct/cable, see FIG. 10. If the cut is made correctly the length of the duct/cable will be sufficient so that the duct/cable is long enough to reach the final location without splicing. In this way the ducts/cables are one by one routed to each passed location through the branches.

Depending on the width of the trench and the size of the ducts/communication cables there may be one or more ducts/communication cables side by side as the uppermost ducts/communication cables in the main trench. It is important that the duct/communication cable next to be routed to its final location is always one of the ones on top. To achieve this is, when cutting the main trench and placing a number of ducts/communication cables, to cut one of the uppermost ducts/communication cables, the one designated to this specific location, at a certain distance after passing the corresponding branching trench, so that the cut duct/communication cable can be lifted and routed through that branching micro trench to its final location. The duct/communication cable should be cut at a certain minimum distance after passing the corresponding branching trench, so that, when lifted from the main trench and routed towards its final location, the length is sufficient to reach the final location without splicing.

If the stabilizing device (formerly known as "plough") is designed with individual channels for the ducts/cables or with individual channels, each with room for a few ducts/cables, it is easy to know which duct/cable will be on top in the trench and thereby which duct/cable should be cut before the stabilizing device. Example of such stabilizing device is shown in FIG. 9. The stabilizing device in this embodiment has a duct/cable inlet and a duct/cable outlet which is connected to each other by means of a plurality of channels as guiding means (illustrated with dotted lines) for the ducts/cables. The underground outlet of the stabilizing device may in an embodiment comprise a "matrix" (or vector) part so arranged that the channels are arranged in a matrix with n row and m columns, thereby in a controlled way horizontally and/or vertically separating the ducts/cables when placing them in the micro trench.

So in summary, the above described embodiment of the method involves; one after the other, cutting one of the uppermost ducts/communication cables, which one is designated to a certain location, at a certain minimum distance after each branch and thereafter lifting this duct/communication cable from the main trench and routing it to its final location through the branch.

The machine may further comprise at least one drum arranged for holding the ducts/communication cables before placing them into the micro trench via the stabilizing device. In this way easy access to the ducts/communication cables is achieved.

Further, the machine may also comprises other suitable means, such as: one or more engine means for powering the saw blade and the stabilizing device and/or for driving means (e.g. drive train and wheels), communication means for wireless communication with e.g. a remote server unit, processing means, memory means, sensors, GPS means, vehicle means, display means for displaying information such as graphics, data base means, reading means for reading mechanical coding means on the saw blade, immobilizer, etc.

Regarding the driving of the saw blade and/or the stabilizing device this can e.g. be performed by means of direct mechanical driving, hydraulic driving and electric driving, as shown in FIG. 8. The mechanical driving gives the highest power transmission ratio while the electrical driving gives the lowest, so the former is preferred if high power is needed which often is the case.

Finally, it should be understood that the present invention is not limited to the embodiments described above, but also relates to and incorporates all embodiments within the scope of the appended independent claims.

The invention claimed is:

1. A machine for installing at least one duct/communication cable in an area comprising a first layer and a second layer, said first layer being a road layer, such as asphalt or concrete, and said second layer being a bearing layer for said first layer and being located below said first layer, said second layer comprising at least one of sand, gravel, stones and dirt; said machine comprising:
   a diamond saw blade arranged for sawing a micro trench to a depth of d in said area through said first layer and into said second layer; and
   a combined stabilizing and placing device positioned immediately behind said diamond saw blade for stabilizing said second layer in said micro trench while placing ducts/communication cables inside said micro trench by means of at least one guiding means comprised in said stabilizing device so that all said ducts/communication cables are placed below said first layer;
   wherein said machine is able to adjust said depth d; and
   wherein an operating depth of said stabilizing device in said micro trench is less than an operating depth of said diamond saw blade.

2. The machine according to claim 1, wherein said machine is able to adjust said depth d while in operation.

3. The machine according to claim 1, wherein said machine is arranged to continuously reduce said depth d as the number of ducts/communication cables placed in said micro trench is reduced.

4. The machine according to claim 1, wherein said operating depth of said stabilizing device is up to 50 mm less than said operating depth of said diamond saw blade.

5. The machine according to claim 1, wherein said depth d>d1+d2, where d1 is a depth of said first layer and d2 is a height of said at least one duct/communication cable in said micro trench.

6. The machine according to claim 1, wherein said depth d is between 200-500 mm.

7. The machine according to claim 1, wherein said micro trench has a width w between 10-30 mm.

8. The machine according to claim 1, wherein said diamond saw blade is arranged for up-cut.

9. The machine according to claim 1, wherein said diamond saw blade is arranged to be elevated and lowered by means of hydraulic or electric driving.

10. The machine according to claim 1, wherein said stabilizing device is arranged to be elevated and lowered by means of hydraulic or electric driving.

* * * * *